Patented Feb. 17, 1942

2,273,788

UNITED STATES PATENT OFFICE 2,273,788

ALKYL UREA-FORMALDEHYDE RESIN

John F. Olin, Grosse Ile, Mich., assignor to Sharples Chemicals Inc., a corporation of Delaware No Drawing. Application January 30, 1940, Serial No. 316,315

14 Claims. (Cl. 260—69)

This application is a continuation in part of my prior application, Serial Number 164,525, filed September 18, 1937, for Manufacture of resins.

The present invention relates to the art of synthetic resins and to the formation of resins of the general type produced by condensation of urea and its derivatives with formaldehyde or its equivalent, such as paraformaldehyde, tri-oxymethylene, or hexamethylene tetramine.

It is a well-known fact that urea may be reacted with formaldehyde to produce condensation products. This reaction may be greatly accelerated by the use of small amounts of acids as catalysts and it may also be accelerated with the aid of alkaline catalysts. The resulting condensation products may be converted into hard, solid resins by the application of heat to remove water and excess formaldehyde and cause further polymerization.

The resulting resins are valuable in commerce because of their pale color and transparency and the fact that they may be molded into various useful shapes. Their relative insolubility in organic solvents, however, limits their utility in coating compositions. When higher alkyl ureas such as butyl area, amyl area, hexyl urea, heptyl urea, cyclohexyl urea, etc., are condensed with formaldehyde in accordance with the method discussed above, the resulting condensation products are soluble in certain organic solvents but they cannot ordinarily be solidified by the action of heat in the manner in which resins produced from urea, thio-urea or the lower homologues of urea such as methyl urea and ethyl urea can be solidified.

An object of the present invention has been to produce a solid condensation product of the general type of that produced by condensation of urea with formaldehyde, which has the advantages of the condensation products obtained by condensing butyl urea with formaldehyde, for example, in that it is soluble in organic solvents such as amyl alcohol, but retains the advantageous properties of the condensation product of urea with formaldehyde in that it can be solidified by the application of heat.

The present invention rests upon the discovery that condensation products obtained by condensing with aldehydes alkyl ureas having four or more carbon atoms in the alkyl radical may be solidified by the application of heat provided a sufficient proportion of urea or one of the lower alkyl homologues thereof (such as methyl or ethyl urea) is condensed with the aldehyde in the same reaction in which the higher alkyl urea is condensed. An amount of unsubstituted or lower alkyl substituted urea constituting at least 16⅔% of the urea derivative-containing mixture to be condensed with formaldehyde will usually be sufficient to produce a resin which may be solidified by the action of heat, and this result may sometimes be accomplished with an even smaller proportion of urea or lower alkyl urea.

Thus, when primary or secondary amyl urea is condensed with formaldehyde, the resulting product is an oily liquid and can not be solidified even by the application of heat to that liquid for an indefinite period of time. When a small proportion of urea is mixed with amyl urea, however, and the mixture of urea and amyl urea is condensed with formaldehyde in the presence or absence of an acid or basic catalyst, the resulting condensation product may be heated to drive off water and formaldehyde, and the further application of heat will cause polymerization of the condensate to produce a solid, transparent resin which is soluble in amyl alcohol. Similarly advantageous results may be obtained by condensing other higher alkyl ureas such as butyl urea, hexyl urea, heptyl urea, octyl urea and cyclohexyl urea, with aldehydes in the presence of relatively small proportions of urea, methyl urea, ethyl urea or thio urea.

Solid resins may be produced by condensing tertiary alkyl ureas or cyclohexyl urea with formaldehyde, without incorporating any urea, methyl urea, or ethyl urea in the reaction mixture. Even in the case of resins produced from these derivatives, however, it is desirable that some urea, methyl urea or ethyl urea be condensed with formaldehyde along with the higher alkyl urea in order to produce a harder resin than would otherwise be attainable from the tertiary alkyl or cyclohexyl urea.

*Example I*

Butyl ammonium chloride was refluxed with urea in water solution to produce a monobutyl urea. 20 grams of the butyl urea so produced were mixed with 10 grams of urea and with 45 grams of formaldehyde. 0.5 gram of hydrochloric acid was added to the reaction mixture and the reaction was allowed to proceed for a period of 15 minutes. The viscous oil layer was separated and was then heated to a temperature of 100° C. for a period of 24 hours. At the conclusion of this heating step, the condensation product was a hard, horny, transparent resin of light color. This resin was found to be soluble in alcohols having 1–6 carbon atoms.

Example II 20 grams of butyl urea were mixed with 5 grams of urea and with 45 grams of formaldehyde. The mixture was condensed in the same manner as in Example I. The condensation reaction produced a tough, colorless, slightly tacky resin which was easily soluble in alcohols of 1-6 carbon atoms. The alcohol solution was found to be soluble in nitro cellulose solution. The homogeneous lacquers so produced do not require plasticizers and films produced by application of said lacquers adhere excellently to a coated surface.

Example III 20 grams of butyl urea were mixed with 10 grams of thio urea in 10 grams of hot water. 45 grams of formaldehyde were added and the mixture was condensed in the presence of hydrochloric acid in the same manner as in Example I. The resulting resin was found to be soluble in alcohols of 1-6 carbon atoms.

In the practice of the invention, it is not entirely essential that the higher alkyl urea and urea or lower alkyl urea be mixed with each other and with the formaldehyde at the very start of the condensation reaction. The invention may be practiced by partially condensing either urea constituent with formaldehyde and introducing the other urea constituent at an intermediate stage of the condensation reaction.

As a still further alternative, the urea or lower alkyl urea may be condensed with formaldehyde to an intermediate stage, and the higher alkyl urea may be condensed to a similar stage in a separate reaction. The two partial condensation reaction products may then be combined for further condensation and hardening in a single final operation.

While the invention has been discussed above in terms of production of solid resins, urea and lower alkyl urea derivatives may be combined with alkyl urea derivatives containing at least four substitutent carbon atoms in the practice of the invention to produce products which are not solid resins, but are viscous liquids, falling within the scope of the invention. These viscous liquids have value as plasticizers and adhesives. The inclusion of a higher proportion of urea or lower alkyl urea in the reaction mixture tends to give the ultimate condensation product, after heat treatment to attain the solid form, increased solidity and hardness. Increasing the proportion of the higher alkyl urea, on the other hand, tends to produce a softer resin, in case a solid resin is produced, or tends to produce a viscous liquid condensation product instead of a solid resin, in case the proportion of the higher alkyl urea is very high. From the above discussion, persons skilled in the art will be able to produce either a solid resin or a viscous liquid condensation product having value as an adhesive or plasticizer, depending upon the relative proportions of the higher alkyl urea and urea or lower alkyl urea, respectively, employed in the condensation reaction.

Modifications will be obvious to those skilled in the art, and I do not therefore wish to be limited except by the scope of the sub-joined claims.

I claim:

1. A condensation product formed by the condensation reaction with formaldehyde of a mixture of an unsubstituted urea and a urea substituted by an alkyl radical containing at least four carbon atoms, said unsubstituted urea being present in the condensation reaction in an amount sufficient to permit the final product to be hardened by the application of heat, and said higher alkyl substituted urea being present in the condensation reaction in an amount sufficient to enable the final product to be dissolved in organic solvents.

2. A condensation product as described in claim 1 in which the mixture of unsubstituted urea and higher alkyl substituted urea contains at least sixteen and two-thirds per cent by weight of unsubstituted urea.

3. A process of producing condensation products which comprises condensing with formaldehyde a mixture of an unsubstituted urea and a urea substituted by an alkyl radical containing at least four carbon atoms, said unsubstituted urea constituting at least sixteen and two-thirds per cent by weight of the mixture of unsubstituted urea and higher alkyl substituted urea.

4. A condensation product formed by the condensation reaction with formaldehyde of a mixture of an unsubstituted urea and a urea substituted by an alkyl radical containing at least four carbon atoms, said unsubstituted urea being present in the condensation reaction in an amount sufficient to permit the final product to be solidified by the application of heat, and said higher alkyl substituted urea being present in the condensation reaction in an amount sufficient to enable the final product to be dissolved in organic solvents.

5. A condensation product formed by the condensation reaction with formaldehyde of a mixture of: (1) a substance selected from the class consisting of urea, thiourea, methyl urea, and ethyl urea; and (2) a urea substituted by an alkyl radical containing at least four carbon atoms; the substance selected from said class being present in the condensation reaction in an amount sufficient to permit the final product to be hardened by the action of heat, and the higher alkyl substituted urea (2) being present in the condensation reaction in an amount sufficient to enable the final product to be dissolved in organic solvents.

6. A condensation product as described in claim 5 in which the mixture of ureas contains at least 16⅔ per cent by weight of the substance selected from the class consisting of urea, thiourea, methyl urea and ethyl urea.

7. A process of producing condensation products that comprises condensing with formaldehyde a mixture of: (1) a substance selected from the class consisting of urea, thiourea, methyl urea, and ethyl urea; and (2) a urea substituted by an alkyl radical containing at least four carbon atoms; the said selected substance (1) constituting at least 16⅔ per cent by weight of the urea mixture.

8. A condensation product formed by the condensation reaction with formaldehyde of a mixture of (1) a substance selected from the class consisting of urea, thiourea, methyl urea, and ethyl urea; and (2) a urea substituted by an alkyl radical containing at least four carbon atoms; said selected substance (1) being present in the condensation reaction in an amount sufficient to permit the final product to be solidified by the application of heat, and said higher alkyl substituted urea (2) being present in the condensation reaction in an amount sufficient to enable the final product to be dissolved in organic solvents.

9. Heat-hardenable condensation products characterized by being soluble in alcohols having one to six carbon atoms formed by condensing formaldehyde with a mixture consisting of (1) alkyl ureas wherein the alkyl substituent contains a minimum of four carbon atoms, and (2) a substance selected from the class consisting of urea, thiourea, methyl urea, and ethyl urea.

10. A process of producing condensation products that comprises condensing with formaldehyde a mixture of: (1) a substance selected from the class consisting of urea, thiourea, methyl urea, and ethyl urea, present in the condensation reaction in an amount sufficient to permit the final product to be hardened by heat treatment; and (2) a urea substituted by an alkyl radical containing at least four carbon atoms, present in the condensation reaction in an amount sufficient to permit the final product to be dissolved in organic solvents.

11. A viscid liquid intermediate condensation product prepared by the process described in claim 10.

12. A solid final condensation product prepared by the process described in claim 10.

13. A process of producing condensation products that comprises condensing with formaldehyde at least two different urea compounds, one of which is selected from the class consisting of urea, thiourea, methyl urea and ethyl urea, and the other is a higher alkyl substituted urea containing at least four substituent alkyl carbon atoms, one of said urea compounds being initially reacted with formaldehyde to form a condensation product which is thereafter reacted with the other urea compound to form the flanl condensation product.

14. In the manufacture of condensation products of formaldehyde with urea and derivatives thereof, the process that comprises condensing with formaldehyde at least two urea compounds of which one is chosen from the class consisting of thiourea, methyl urea, and ethyl urea, and the other urea compound is an alkyl substituted urea containing at least four substituent alkyl carbon atoms, by condensing the urea compound of one of the mentioned classes with formaldehyde to form a liquid condensation product, forming a liquid condensation product between a urea of the other class of urea compounds and formaldehyde, and thereafter mixing and heating said liquid condensation products to effect further condensation between said initial liquid reaction product and the subsequently added substance.

JOHN F. OLIN.